United States Patent
Park et al.

(10) Patent No.: US 8,986,153 B2
(45) Date of Patent: Mar. 24, 2015

(54) PLANETARY GEAR TRAIN OF AUTOMATIC TRANSMISSION FOR VEHICLES

(75) Inventors: Jongsool Park, Hwaseong-si (KR); Tae Seok Seo, Suwon-si (KR); Hyukjun Lee, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 259 days.

(21) Appl. No.: 13/551,101

(22) Filed: Jul. 17, 2012

(65) Prior Publication Data

US 2013/0150203 A1 Jun. 13, 2013

(30) Foreign Application Priority Data

Dec. 7, 2011 (KR) ........................ 10-2011-0130513

(51) Int. Cl.
- *F16H 3/62* (2006.01)
- *F16H 3/44* (2006.01)
- *F16H 37/06* (2006.01)
- *F16H 3/66* (2006.01)

(52) U.S. Cl.
CPC ................ *F16H 3/663* (2013.01); *F16H 3/666* (2013.01); *F16H 2200/0065* (2013.01); *F16H 2200/201* (2013.01); *F16H 2200/2012* (2013.01); *F16H 2200/2046* (2013.01); *F16H 2200/2097* (2013.01)
USPC ......................................... 475/275; 475/330

(58) Field of Classification Search
CPC ................ F16H 2200/0065; F16H 2200/2028; F16H 2200/2046
USPC .......................... 475/275, 323, 325, 329, 330
See application file for complete search history.

(56) References Cited

U.S. PATENT DOCUMENTS

| | | | | |
|---|---|---|---|---|
| 7,226,381 | B2 * | 6/2007 | Klemen | 475/275 |
| 8,517,886 | B2 * | 8/2013 | Seo et al. | 475/288 |
| 8,556,768 | B2 * | 10/2013 | Park et al. | 475/286 |
| 8,608,612 | B2 * | 12/2013 | Park et al. | 475/296 |
| 8,647,227 | B2 * | 2/2014 | Park et al. | 475/275 |
| 2011/0045942 | A1 | 2/2011 | Gumpoltsberger et al. | |
| 2012/0329600 | A1 * | 12/2012 | Park et al. | 475/276 |
| 2013/0029799 | A1 * | 1/2013 | Park et al. | 475/276 |

FOREIGN PATENT DOCUMENTS

| | | |
|---|---|---|
| KR | 10-0960186 B1 | 5/2010 |
| KR | 10-1028544 B1 | 4/2011 |

* cited by examiner

*Primary Examiner* — Tisha Lewis
(74) *Attorney, Agent, or Firm* — Morgan, Lewis & Bockius LLP

(57) ABSTRACT

A planetary gear train of an automatic transmission may include a first planetary gear set outputting a negative rotation speed by using a rotation speed selectively input from the input shaft, a second planetary gear set outputting a reduced rotation speed by using the rotation speed selectively input from the input shaft or to selectively become a direct-coupling state together with the first planetary gear set, a compound planetary gear set having four rotation elements by combining third and fourth planetary gear sets, seven rotational members including two rotation elements connected to each other or one rotation element among the rotation elements of the first and second planetary gear sets and the compound planetary gear set, and six friction members including clutches, and brakes.

12 Claims, 5 Drawing Sheets

FIG. 3

|    | C1 | C2 | C3 | C4 | C5 | B1 | gear ratio | step ratio |
|----|----|----|----|----|----|----|------------|------------|
| D1 | ○  |    |    |    |    | ○  | 4.592      | D1/D9=7.516 |
| D2 |    |    | ○  |    |    | ○  | 3.027      | D1/D2=1.517 |
| D3 | ○  |    | ○  |    |    |    | 2.321      | D2/D3=1.304 |
| D4 |    |    | ○  |    | ○  |    | 1.599      | D3/D4=1.452 |
| D5 |    | ○  | ○  |    |    |    | 1.209      | D4/D5=1.323 |
| D6 |    |    | ○  | ○  |    |    | 1.000      | D5/D6=1.209 |
| D7 |    | ○  |    | ○  |    |    | 0.838      | D6/D7=1.193 |
| D8 |    |    |    | ○  | ○  |    | 0.704      | D7/D8=1.190 |
| D9 | ○  |    |    | ○  |    |    | 0.611      | D8/D9=1.152 |
| REV |   | ○  |    |    |    | ○  | -4.426     | R/D1=-1.038 |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2011-0130513 filed in the Korean Intellectual Property Office on Dec. 7, 2011, the entire contents of which is incorporated herein for all purposes by this reference.

BACKGROUND OF THE INVENTION

1. Field of the Invention

The present invention relates to an automatic transmission for vehicles. More particularly, the present invention relates to a planetary gear train of an automatic transmission for vehicles which improves power delivery performance and reduces fuel consumption.

2. Description of Related Art

Typically, a planetary gear train is realized by combining a plurality of planetary gear sets, and the planetary gear train including the plurality of planetary gear sets receives torque from a torque converter and changes and transmits the torque to an output shaft.

It is well known that when a transmission realizes a greater number of shift speeds, speed ratios of the transmission can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear).

In addition, the planetary gear train has different features such a durability, power delivery efficiency, and size depend on the layout thereof. Therefore, designs for a combining structure of a gear train are also under continuous investigation.

In addition, the planetary gear train realizes a plurality of shift-speeds. However, another friction member must be operated after one friction member is released so as to shift to a neighboring shift-speed from a view of shift control.

In addition, a step ratio between the neighboring shift-speeds should be controlled to be suitable according to the planetary gear train.

Currently, four-speed and five-speed automatic transmissions are most often found on the market. However, six-speed automatic transmissions have also been realized for enhancement of performance of power transmission and for enhanced fuel mileage of a vehicle. In addition, eight-speed automatic transmissions and tenth-speed automatic transmissions have been developed at a good pace.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for vehicles having advantages of achieving nine forward speeds and a reverse speed with improved controllability of friction members, suitable step ratios, and improved performance and fuel economy by combining a plurality of planetary gear sets with a plurality of friction members.

In a planetary gear train of an automatic transmission for vehicles, may include an input shaft adapted to receive engine torque, an output shaft adapted to output a shifted torque, a first planetary gear set outputting a negative rotation speed by using a rotation speed selectively input from the input shaft, a second planetary gear set outputting a reduced rotation speed by using the rotation speed selectively input from the input shaft or to selectively become a direct-coupling state together with the first planetary gear set, a compound planetary gear set having four rotation elements by combining the third and fourth planetary gear sets, and changing the rotation speed selectively input from the input shaft through two paths and the negative rotation speed and the reduced rotation speed input respectively from the first and second planetary gear sets into nine forward speeds and one reverse speed and to output the nine forward speeds and the one reverse speed, seven rotational members including two rotation elements connected to each other or one rotation element among the rotation elements of the first and second planetary gear sets and the compound planetary gear set, and six friction members including clutches interposed between a selected rotational member among the seven rotational members and the input shaft or between selected rotational members, and brakes interposed between a selected rotational member among the seven rotational members and a transmission housing.

In another aspect of the present invention, a planetary gear train of an automatic transmission for vehicles achieving multiple shift-speeds may include an input shaft adapted to receive engine torque, an output shaft adapted to output a shifted torque, a first planetary gear set being a single pinion planetary gear set having a first sun gear, a first planet carrier, and a first ring gear, a second planetary gear set being a double pinion planetary gear set having a second sun gear, a second planet carrier, and a second ring gear, a compound planetary gear set of Ravingneaux type having a third sun gear, a fourth sun gear, a common planet carrier, and a common ring gear, a first rotational member including the first sun gear and selectively connected to the input shaft, a second rotational member including the first planet carrier and the second sun gear, and directly connected to a transmission housing, a third rotational member including the first ring gear, the second ring gear, and the third sun gear, a fourth rotational member including the second planet carrier and selectively connected to the input shaft, a fifth rotational member including the common planet carrier, and selectively connected to the input shaft or to the transmission housing, a sixth rotational member including the common ring gear and directly connected to the output shaft, a seventh rotational member including the fourth sun gear and selectively connected to the input shaft, and six friction members including clutches interposed between a selected rotational member among the seven rotational members and the input shaft or between selected rotational members, and brakes interposed between a selected rotational member among the rotational members and the transmission housing.

The compound planetary gear set of Ravingneaux type may include the common ring gear, the common planet carrier, the third sun gear engaged with a long pinion, and the fourth sun gear engaged with a short pinion engaged with the long pinion, and the fourth sun gear is engaged to the short pinion, wherein the common ring gear is engaged to the long pinion.

The long pinion may include a large-diameter portion and a small-diameter portion, the third sun gear is engaged to the large-diameter portion, and the common ring gear and the short pinion are engaged to the small-diameter portion, wherein the common ring gear is engaged to the small-diameter portion.

The six friction members may include a first clutch interposed between the input shaft and the first rotational member, a second clutch interposed between the input shaft and the fourth rotational member, a third clutch interposed between the input shaft and the seventh rotational member, a fourth clutch interposed between the input shaft and the fifth rotational member, a fifth clutch interposed between the second rotational member and the fourth rotational member, and a first brake interposed between the fifth rotational member and the transmission housing.

In further another aspect of the present invention, a planetary gear train of an automatic transmission for vehicles achieving multiple shift-speeds, may include an input shaft adapted to receive engine torque, an output shaft adapted to output a shifted torque, a first planetary gear set having a first sun gear, a first planet carrier, and a first ring gear, a second planetary gear set having a second sun gear, a second planet carrier, and a second ring gear, a compound planetary gear set formed by combining a third planetary gear set having a third sun gear, a third planet carrier, and a third ring gear and a fourth planetary gear set having a fourth sun gear, a fourth planet carrier, and a fourth ring gear, a first rotational member including the first sun gear and selectively connected to the input shaft, a second rotational member including the first planet carrier and the second sun gear, and directly connected to a transmission housing, a third rotational member including the first ring gear, the second ring gear, and the third sun gear, a fourth rotational member including the second planet carrier and selectively connected to the input shaft, a fifth rotational member including the third planet carrier and the fourth ring gear, and selectively connected to the input shaft or to the transmission housing, a sixth rotational member including the third ring gear and the fourth planet carrier, and directly connected to the output shaft, a seventh rotational member including the fourth sun gear and selectively connected to the input shaft, and six friction members including clutches interposed between a selected rotational member among the seven rotational members and the input shaft or between selected rotational members, and brakes interposed between a selected rotational member among the seven rotational members and the transmission housing.

The first planetary gear set is a single pinion planetary gear set, the second planetary gear set is a double pinion planetary gear set, the third planetary gear set is a single pinion planetary gear set, and the fourth planetary gear set is a single pinion planetary gear set.

The six friction members may include a first clutch interposed between the input shaft and the first rotational member, a second clutch interposed between the input shaft and the fourth rotational member, a third clutch interposed between the input shaft and the seventh rotational member, a fourth clutch interposed between the input shaft and the fifth rotational member, a fifth clutch interposed between the second rotational member and the fourth rotational member, and a first brake interposed between the fifth rotational member and the transmission housing.

The multiple shift-speeds may include a first forward speed achieved by operating the first clutch and the first brake, a second forward speed achieved by operating the third clutch and the first brake, a third forward speed achieved by operating the first clutch and the third clutch, a fourth forward speed achieved by operating the third clutch and the fifth clutch, a fifth forward speed achieved by operating the second clutch and the third clutch, a sixth forward speed achieved by operating the third clutch and the fourth clutch, a seventh forward speed achieved by operating the second clutch and the fourth clutch, an eighth forward speed achieved by operating the fourth clutch and the fifth clutch, a ninth forward speed achieved by operating the first clutch and the fourth clutch, and a reverse speed achieved by operating the second clutch and the first brake.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is an operational chart of friction members at each shift-speed applied to a planetary gear train according to the various exemplary embodiments of the present invention.

Figure 1:
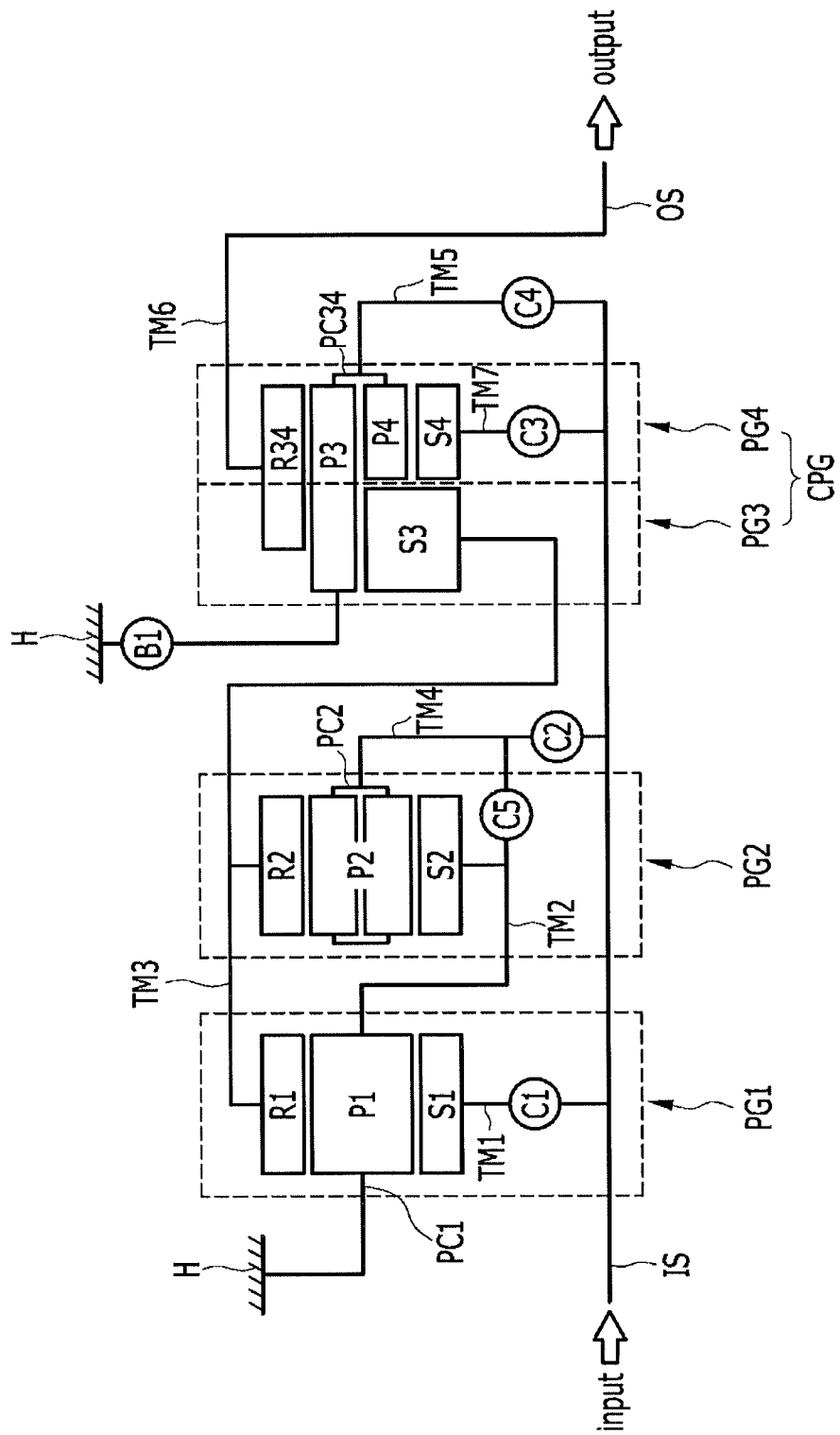
FIG. 1 is a schematic diagram of a planetary gear train according to the various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

Figure 2:
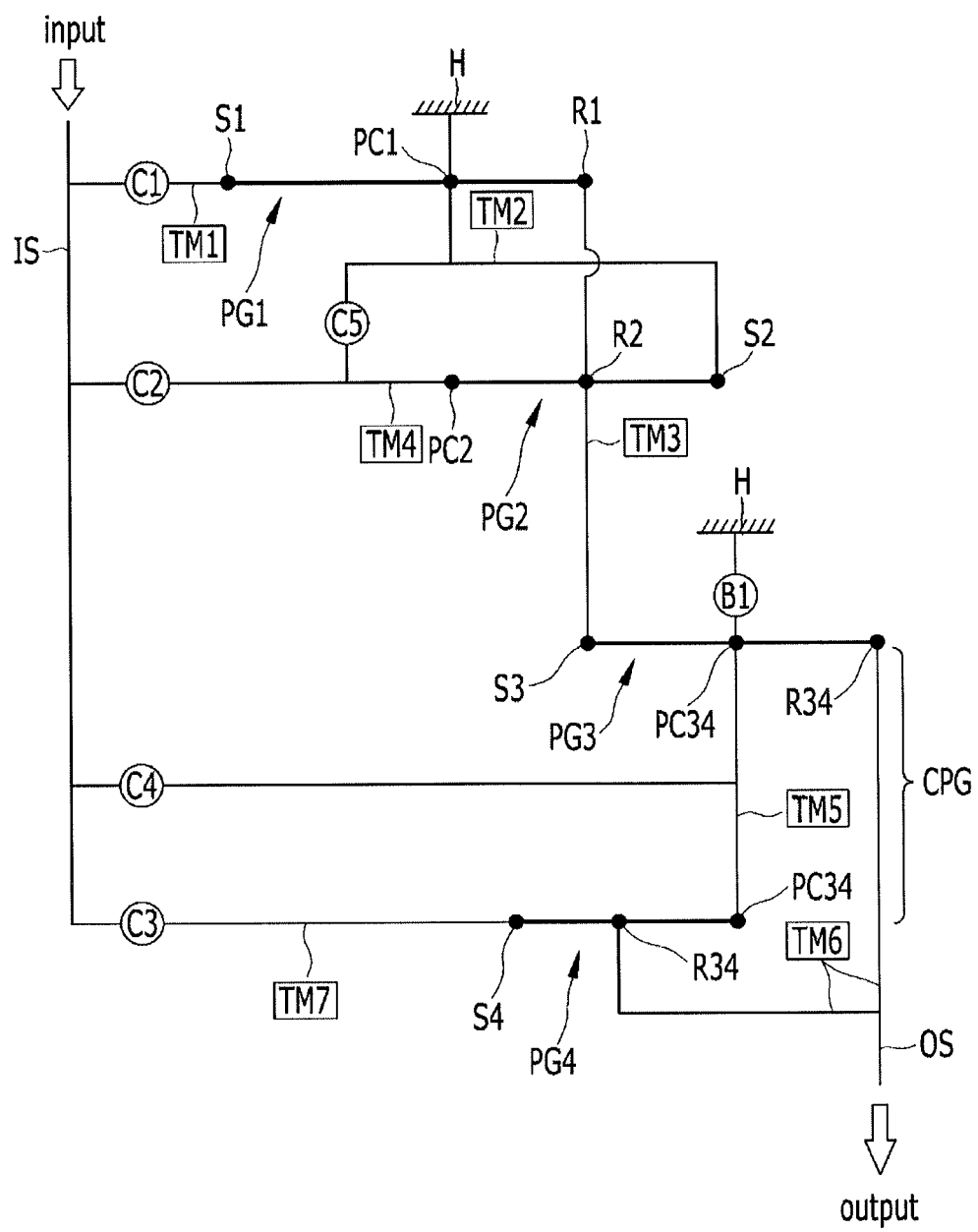
FIG. 2 is a diagram showing connections of a planetary gear train according to the various exemplary embodiments of the present invention.

FIG. 1 is a schematic diagram of a planetary gear train according to the first exemplary embodiment of the present invention, and FIG. 2 is a diagram showing connections of a planetary gear train according to the first exemplary embodiment of the present invention.

Referring to FIG. 1 and FIG. 2, a planetary gear train according to the first exemplary embodiment of the present invention includes first, second, third, and fourth planetary gear sets PG1, PG2, PG3, and PG4 disposed on the same axis, an input shaft IS, and output shaft OS, seven rotational members TM1-TM7 directly or selectively connecting rotation elements of the first, second, third, and fourth planetary gear sets PG1, PG2, PG3, and PG4, six friction members C1-C5 and B1, and a transmission housing H.

In addition, the first and second planetary gear sets PG1 and PG2 are operated independently, and a compound planetary gear set CPG of Ravingneaux type is formed by combining the third and fourth planetary gear sets PG3 and PG4.

A rotation speed input from the input shaft IS is changed by the first and second planetary gear sets PG1 and PG2 and the compound planetary gear set CPG and is output through the output shaft OS.

In addition, the planetary gear sets are disposed in a sequence of the first and second planetary gear sets PG1 and PG2 and the compound planetary gear set CPG from an engine to the rear.

The input shaft IS is an input member, and torque from a crankshaft of the engine is changed through a torque converter and is input to the input shaft IS.

The output shaft OS is an output member and delivers driving torque so as to run driving wheels through a differential apparatus.

The first planetary gear set PG1 is a single pinion planetary gear set, and includes a first sun gear S1, a first ring gear R1, and a first planet carrier PC1 rotatably supporting a first pinion P1 engaged with the first sun gear S1 and the first ring gear R1.

The second planetary gear set PG2 is a double pinion planetary gear set, and includes a second sun gear S2, a second ring gear R2, and a second planet carrier PC2 rotatably supporting a pair of second pinions P2 engaged with the second sun gear S2 and the second ring gear R2.

The compound planetary gear set CPG is formed by combining the third planetary gear set PG3 being a single pinion planetary gear set and the fourth planetary gear set PG4 being a double pinion planetary gear set so as to be the compound planetary gear set of Ravingneaux type having a ring gear and a planet carrier in common.

Therefore, the compound planetary gear set CPG is operated by four rotation elements including the ring gear, the planet carrier, and two sun gears. For convenience of explanation, the ring gear is called a common ring gear R34, the planet carrier is called a common planet carrier PC34, the sun gear engaged with a long pinion P3 is called a third sun gear S3, and the sun gear engaged with a short pinion P4 is called a fourth sun gear S4.

At least one of rotation elements of the first and second planetary gear sets PG1 and PG2 and the compound planetary gear set CPG is directly connected to each other.

In further detail, the first ring gear R1 of the first planetary gear set PG1 is directly connected to the second ring gear R2 of the second planetary gear set PG2 and the third sun gear S3 of the compound planetary gear set CPG, and the first planet carrier PC1 of the first planetary gear set PG1 is directly connected to the second sun gear S2 of the second planetary gear set PG2.

Therefore, the planetary gear train according to the first exemplary embodiment of the present invention includes seven rotational members TM1-TM7.

The first rotational member TM1 includes the first sun gear S1 and is selectively connected to the input shaft IS so as to be operated as a selective input element.

The second rotational member TM2 includes the first planet carrier PC1 and the second sun gear S2, and is directly connected to the transmission housing H so as to be always operated as a fixed element.

The third rotational member TM3 includes the first ring gear R1, the second ring gear R2, and the third sun gear S3.

The fourth rotational member TM4 includes the second planet carrier PC2 and is selectively connected to the input shaft IS so as to be operated as a selective input element.

The fifth rotational member TM5 includes the common planet carrier PC34, and is selectively connected to the input shaft IS so as to be operated as a selective input element or is selectively connected to the transmission housing H so as to be operated as a selective fixed element.

The sixth rotational member TM6 includes the common ring gear R34 and is directly connected to the output shaft OS so as to be operated as a final output element.

The seventh rotational member TM7 includes the fourth sun gear S4 and is selectively connected to the input shaft IS so as to be operated as a selective input element.

In addition, rotational members operated as selective input elements among the rotational members TM1-TM7 are selectively connected to the input shaft IS through clutches C1, C2, C3, and C4, and the rotational members among the rotational members TM1-TM7 are connected to each other through a clutch C5.

In addition, the rotational member operated as the selective fixed element among the rotational members TM1-TM7 is connected to the transmission housing H through a brake B1.

A first clutch C1 is interposed between the input shaft IS and the first rotational member TM1 so as to operate the first rotational member TM1 as the selective input element.

A second clutch C2 is interposed between the input shaft IS and the fourth rotational member TM4 so as to operate the fourth rotational member TM4 as the selective input element.

A third clutch C3 is interposed between the input shaft IS and the seventh rotational member TM7 so as to operate the seventh rotational member TM7 as the selective input element.

A fourth clutch C4 is interposed between the input shaft IS and the fifth rotational member TM5 so as to operate the fifth rotational member TM5 as the selective input element.

A fifth clutch C5 is interposed between the second rotational member TM2 and the fourth rotational member TM4 so as to cause the first and second planetary gear sets PG1 and PG2 to become direct-coupling states. At this time, the rotation elements of the first and second planetary gear sets PG1 and PG2 are operated as fixed elements.

A first brake B1 is interposed between the fifth rotational member TM5 and the transmission housing H so as to operate the fifth rotational member TM5 as the selective fixed element.

Friction members including the first, second, third, fourth, and fifth clutches C1, C2, C3, C4, and C5 and the first brake B1 are conventional multi-plate friction elements of wet type that are operated by hydraulic pressure.

FIG. 3 is an operational chart of friction members at each shift-speed applied to a planetary gear train according to the first exemplary embodiment of the present invention.

As shown in FIG. 3, two friction members are operated at each shift-speed to according the first exemplary embodiment of the present invention.

A first forward speed D1 is achieved by operating the first clutch C1 and the first brake B1.

A second forward speed D2 is achieved by operating the third clutch C3 and the first brake B1.

A third forward speed D3 is achieved by operating the first clutch C1 and the third clutch C3.

A fourth forward speed D4 is achieved by operating the third clutch C3 and the fifth clutch C5.

A fifth forward speed D5 is achieved by operating the second clutch C2 and the third clutch C3.

A sixth forward speed D6 is achieved by operating the third clutch C3 and the fourth clutch C4.

A seventh forward speed D7 is achieved by operating the second clutch C2 and the fourth clutch C4.

An eighth forward speed D8 is achieved by operating the fourth clutch C4 and the fifth clutch C5.

A ninth forward speed D9 is achieved by operating the first clutch C1 and the fourth clutch C4.

A reverse speed REV is achieved by operating the second clutch C2 and the first brake B1.

In a state that the rotation speed of the input shaft IS is input to the first rotational member TM1 by operation of the first clutch C1 at the first, third, and ninth forward speeds, the second rotational member TM2 is operated as the fixed element in the first planetary gear set PG1. Therefore, the first planetary gear set PG1 outputs a negative rotation speed through the third rotational member TM3.

In a state that the rotation speed of the input shaft IS is input to the fourth rotational member TM4 by operation of the second clutch C2 at the fifth and seventh forward speeds and the reverse speed, the second rotational member TM2 is operated as the fixed element in the second planetary gear set PG2. Therefore, the second planetary gear set PG2 outputs a reduced rotation speed through the third rotation element TM3.

The compound planetary gear set CPG converts rotation speeds input through the third rotational member TM3, the fifth rotational member TM5, and the seventh rotational member TM7 and achieves the nine forward speeds and the one reverse speed.

The planetary gear train according to the first exemplary embodiment of the present invention combines four planetary gear sets with the six friction members such that the nine forward speeds and one reverse speed can be achieved by operating the selected two friction members at each shift-speed.

Since six friction members are used, a hydraulic control system controlling the friction members can be simplified, and cost and weight may be reduced. In addition, it is easy for the planetary gear train to be mounted.

A sequential shifting is performed by releasing one friction member and operating another friction member. Therefore, shift control may be facilitated.

In addition, speed ratio characteristic and a step ratio between neighboring shift-speeds at low gear ratio/high gear ratio demanded by vehicle power performance is almost uniform as shown in FIG. 3.

Figure 4:
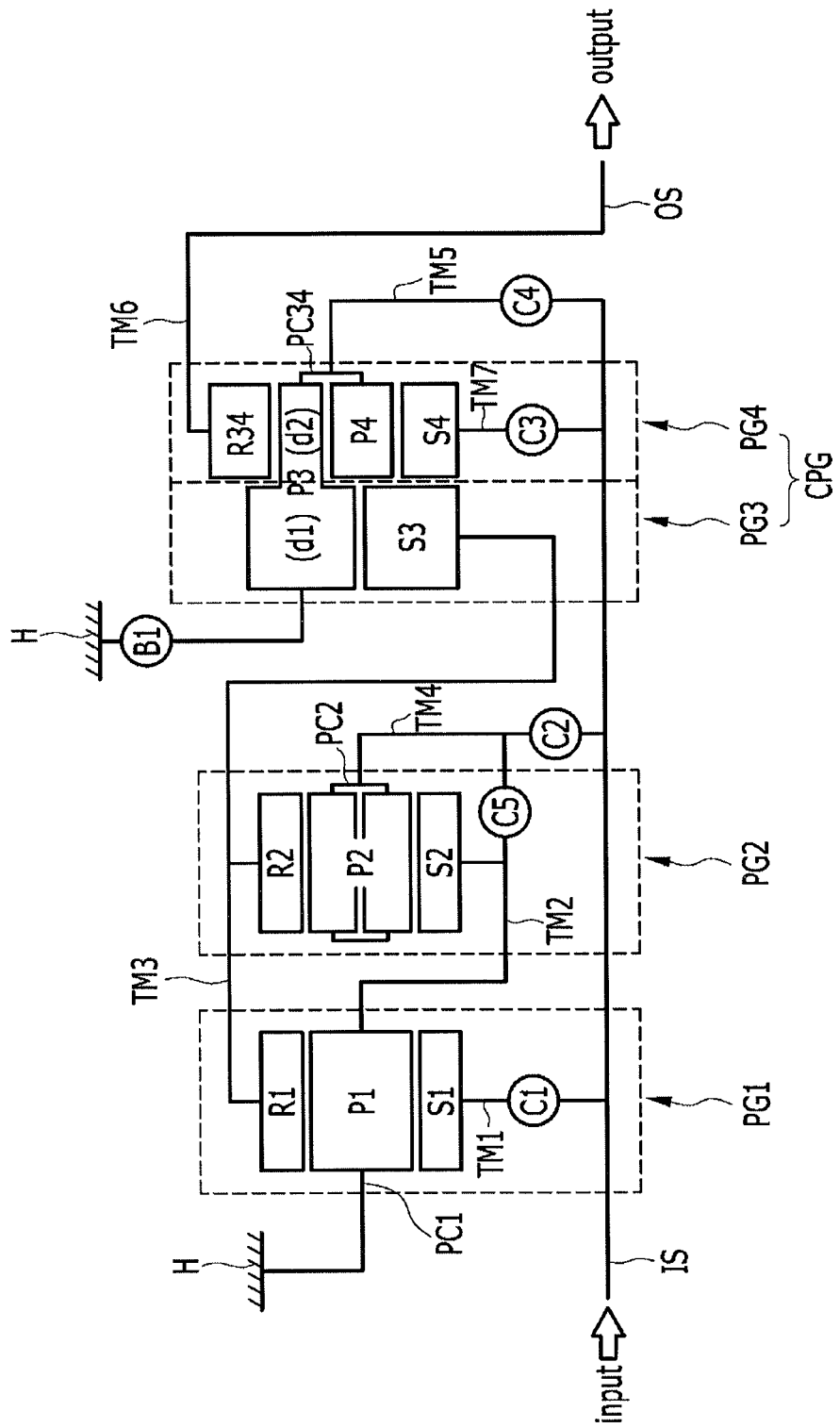
FIG. 4 is a schematic diagram of a planetary gear train according to the various exemplary embodiments of the present invention.

FIG. 4 is a schematic diagram of a planetary gear train according to the second exemplary embodiment of the present invention.

Referring to FIG. 4, the compound planetary gear set of Ravingneaux type according to the second exemplary embodiment includes the long pinion P3 having a large-diameter portion d1 and a small-diameter portion d2.

In addition, the large-diameter portion d1 of the long pinion P3 is engaged with the third sun gear S3, and the small-diameter portion d2 of the long pinion P3 is engaged with the common ring gear R34 and the short pinion P4.

Therefore, arrangements and operations of the rotational members TM1-TM7 and the friction members C1-C5 and B1 according to the second exemplary embodiment are the same as those according to the first exemplary embodiment except gear ratios. Therefore, detailed description of the second exemplary embodiment will be omitted.

Figure 5:
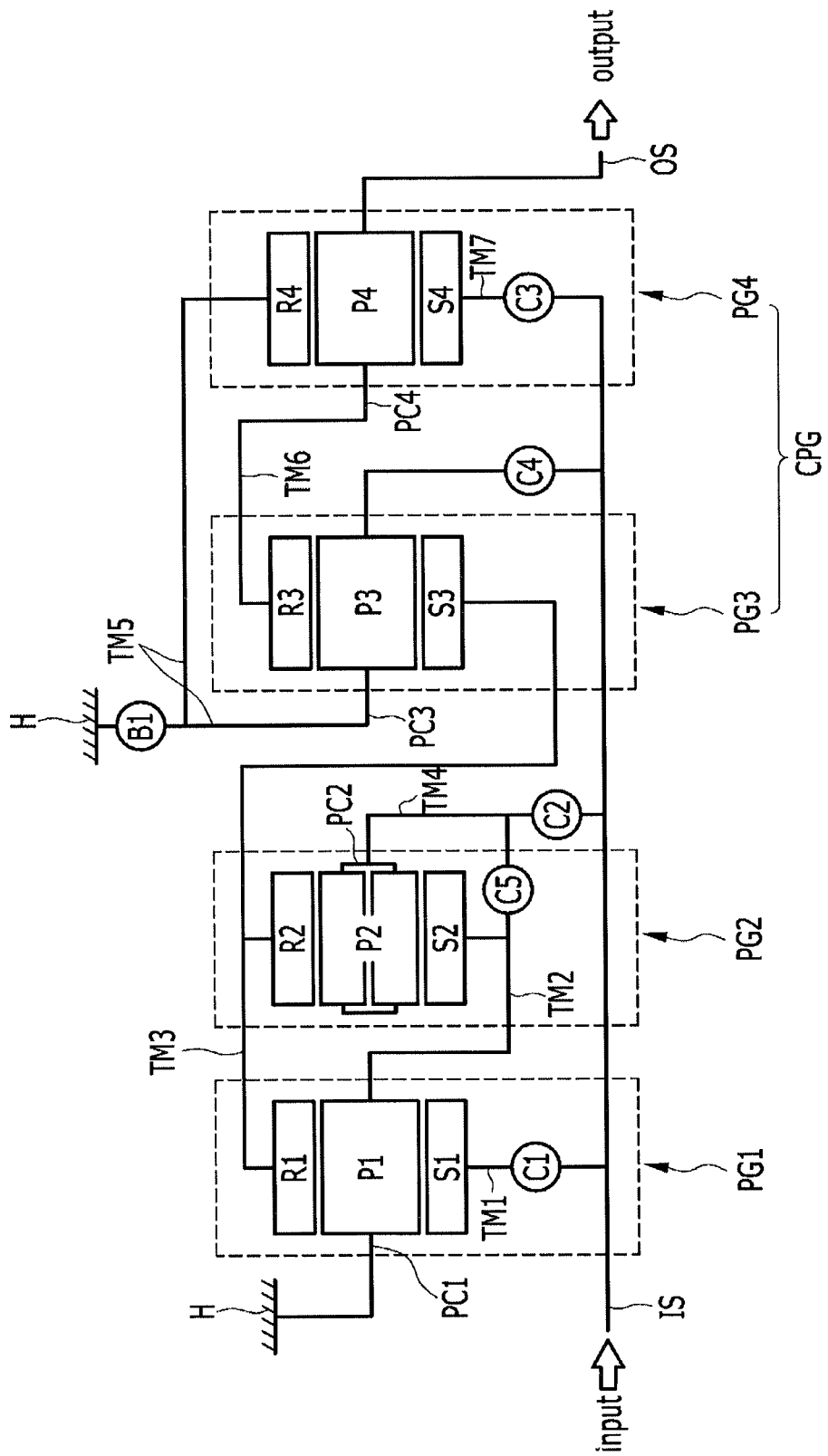
FIG. 5 is a schematic diagram of a planetary gear train according to the various exemplary embodiments of the present invention.

FIG. 5 is a schematic diagram of a planetary gear train according to the third exemplary embodiment of the present invention.

Referring to FIG. 5, the first and second exemplary embodiments use the compound planetary gear set of Ravingneaux type, but the third exemplary embodiment uses the compound planetary gear set including the third and fourth planetary gear sets PG3 and PG4 being single pinion planetary gear sets.

That is, the third planetary gear set PG3 is a single pinion planetary gear set and includes the third sun gear S3, the third ring gear R3, and the third planet carrier PC3 rotatably supporting the third pinion P3 engaged with the third sun gear S3 and the third ring gear R3.

The fourth planetary gear set PG4 is a single pinion planetary gear set and includes the fourth sun gear S4, the fourth ring gear R4, and the fourth planet carrier PC4 rotatably supporting the fourth pinion P4 engaged with the fourth sun gear S4 and the fourth ring gear R4.

In addition, the third ring gear R3 is directly connected to the fourth planet carrier PC4 and the third planet carrier PC3 is directly connected to the fourth ring gear R4.

Therefore, the planetary gear train according to the third exemplary embodiment of the present invention includes seven rotational members TM1-TM7.

The first rotational member TM1 includes the first sun gear S1 and is selectively connected to the input shaft IS so as to be operated as a selective input element.

The second rotational member TM2 includes the first planet carrier PC1 and the second sun gear S2, and is directly connected to the transmission housing H so as to be always operated as a fixed element.

The third rotational member TM3 includes the first ring gear R1, the second ring gear R2, and the third sun gear S3.

The fourth rotational member TM4 includes the second planet carrier PC2 and is selectively connected to the input shaft IS so as to be operated as a selective input element.

The fifth rotational member TM5 includes the third planet carrier PC3 and the fourth ring gear R4, and is selectively connected to the input shaft IS so as to be operated as a selective input element or is selectively connected to the transmission housing H so as to be operated as a selective fixed element.

The sixth rotational member TM6 includes the third ring gear R3 and the fourth planet carrier PC4, and is directly connected to the output shaft OS so as to be operated as a final output element.

The seventh rotational member TM7 includes the fourth sun gear S4 and is selectively connected to the input shaft IS so as to be operated as a selective input element.

In addition, rotational members operated as selective input elements among the rotational members TM1-TM7 are selectively connected to the input shaft IS through clutches C1, C2, C3, and C4, and the rotational members among the rotational members TM1-TM7 are connected to each other through a clutch C5.

In addition, the rotational member operated as the selective fixed element among the rotational members TM1-TM7 is connected to the transmission housing H through a brake B1.

The first clutch C1 is interposed between the input shaft IS and the first rotational member TM1 so as to operate the first rotational member TM1 as the selective input element.

The second clutch C2 is interposed between the input shaft IS and the fourth rotational member TM4 so as to operate the fourth rotational member TM4 as the selective input element.

The third clutch C3 is interposed between the input shaft IS and the seventh rotational member TM7 so as to operate the seventh rotational member TM7 as the selective input element.

The fourth clutch C4 is interposed between the input shaft IS and the fifth rotational member TM5 so as to operate the fifth rotational member TM5 as the selective input element.

The fifth clutch C5 is interposed between the second rotational member TM2 and the fourth rotational member TM4 so as to cause the first and second planetary gear sets PG1 and PG2 to become direct-coupling states. At this time, the rotation elements of the first and second planetary gear sets PG1 and PG2 are operated as fixed elements.

The first brake B1 is interposed between the fifth rotational member TM5 and the transmission housing H so as to operate the fifth rotational member TM5 as the selective fixed element.

In addition, the friction members according to the third exemplary embodiment are operated at each shift-speed in the same manner as those according to the first exemplary embodiment are. Also, the third exemplary embodiment achieves the nine forward speeds and the one reverse speed. Therefore, detailed description of shifting processes will be omitted.

The planetary gear train according to exemplary embodiments of the present invention combines four planetary gear sets with the six friction members such that the nine forward speeds and one reverse speed can be achieved by operating the selected two friction members at each shift-speed.

Since six friction members are used, a hydraulic control system controlling the friction members can be simplified, and cost and weight may be reduced. In addition, it is easy for the planetary gear train to be mounted.

A sequential shifting is performed by releasing one friction member and operating another friction member. Therefore, shift control may be facilitated.

In addition, speed ratio characteristic and a step ratio between neighboring shift-speeds at low gear ratio/high gear ratio demanded by vehicle power performance is almost uniform as shown in FIG. 3.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

For convenience in explanation and accurate definition in the appended claims, the terms "upper", "lower", "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for vehicles, comprising:
   an input shaft adapted to receive engine torque;
   an output shaft adapted to output a shifted torque;
   a first planetary gear set outputting a negative rotation speed by using a rotation speed selectively input from the input shaft;
   a second planetary gear set outputting a reduced rotation speed by using the rotation speed selectively input from the input shaft or to selectively become a direct-coupling state together with the first planetary gear set;
   a compound planetary gear set having four rotation elements by combining a third and fourth planetary gear set, and changing the rotation speed selectively input from the input shaft through two paths and the negative rotation speed and the reduced rotation speed input respectively from the first and second planetary gear sets into nine forward speeds and one reverse speed and to output the nine forward speeds and the one reverse speed;
   seven rotational members including two rotation elements connected to each other or one rotation element among rotation elements of the first and second planetary gear sets and the four rotation elements of the compound planetary gear set; and
   six friction members including clutches interposed between a selected rotational member among the seven rotational members and the input shaft or between selected rotational members, and brakes interposed between a selected rotational member among the seven rotational members and a transmission housing.

2. A planetary gear train of an automatic transmission for vehicles achieving multiple shift-speeds, the planetary gear train comprising:
   an input shaft adapted to receive engine torque;
   an output shaft adapted to output a shifted torque;
   a first planetary gear set being a single pinion planetary gear set having a first sun gear, a first planet carrier, and a first ring gear;
   a second planetary gear set being a double pinion planetary gear set having a second sun gear, a second planet carrier, and a second ring gear;
   a Ravigneaux compound planetary gear set having a third sun gear, a fourth sun gear, a planet carrier, and a ring gear;
   a first rotational member including the first sun gear and selectively connected to the input shaft;
   a second rotational member including the first planet carrier and the second sun gear, and directly connected to a transmission housing;
   a third rotational member including the first ring gear, the second ring gear, and the third sun gear;
   a fourth rotational member including the second planet carrier and selectively connected to the input shaft;

a fifth rotational member including the planet carrier, and selectively connected to the input shaft or to the transmission housing;

a sixth rotational member including the ring gear and directly connected to the output shaft;

a seventh rotational member including the fourth sun gear and selectively connected to the input shaft; and six friction members including clutches interposed between a selected rotational member among the seven rotational members and the input shaft or between selected rotational members, and brakes interposed between a selected rotational member among the rotational members and the transmission housing.

3. The planetary gear train of claim 2, wherein the Ravigneaux compound planetary gear set includes the ring gear, the planet carrier, the third sun gear engaged with a long pinion, and the fourth sun gear engaged with a short pinion engaged with the long pinion, and the fourth sun gear is engaged to the short pinion.

4. The planetary gear train of claim 3, wherein the ring gear is engaged to the long pinion.

5. The planetary gear train of claim 3, wherein the long pinion includes a large-diameter portion and a small-diameter portion, the third sun gear is engaged to the large-diameter portion, and the ring gear and the short pinion are engaged to the small-diameter portion.

6. The planetary gear train of claim 5, wherein the ring gear is engaged to the small-diameter portion.

7. The planetary gear train of claim 2, wherein the six friction members include:
 a first clutch interposed between the input shaft and the first rotational member;
 a second clutch interposed between the input shaft and the fourth rotational member;
 a third clutch interposed between the input shaft and the seventh rotational member;
 a fourth clutch interposed between the input shaft and the fifth rotational member;
 a fifth clutch interposed between the second rotational member and the fourth rotational member; and
 a first brake interposed between the fifth rotational member and the transmission housing.

8. The planetary gear train of claim 7, wherein the multiple shift-speeds include:
 a first forward speed achieved by operating the first clutch and the first brake;
 a second forward speed achieved by operating the third clutch and the first brake;
 a third forward speed achieved by operating the first clutch and the third clutch;
 a fourth forward speed achieved by operating the third clutch and the fifth clutch;
 a fifth forward speed achieved by operating the second clutch and the third clutch;
 a sixth forward speed achieved by operating the third clutch and the fourth clutch;
 a seventh forward speed achieved by operating the second clutch and the fourth clutch;
 an eighth forward speed achieved by operating the fourth clutch and the fifth clutch;
 a ninth forward speed achieved by operating the first clutch and the fourth clutch; and
 a reverse speed achieved by operating the second clutch and the first brake.

9. A planetary gear train of an automatic transmission for vehicles achieving multiple shift-speeds, the planetary gear train comprising:
 an input shaft adapted to receive engine torque;
 an output shaft adapted to output a shifted torque;
 a first planetary gear set having a first sun gear, a first planet carrier, and a first ring gear;
 a second planetary gear set having a second sun gear, a second planet carrier, and a second ring gear;
 a compound planetary gear set formed by combining a third planetary gear set having a third sun gear, a third planet carrier, and a third ring gear and a fourth planetary gear set having a fourth sun gear, a fourth planet carrier, and a fourth ring gear;
 a first rotational member including the first sun gear and selectively connected to the input shaft;
 a second rotational member including the first planet carrier and the second sun gear, and directly connected to a transmission housing;
 a third rotational member including the first ring gear, the second ring gear, and the third sun gear;
 a fourth rotational member including the second planet carrier and selectively connected to the input shaft;
 a fifth rotational member including the third planet carrier and the fourth ring gear, and selectively connected to the input shaft or to the transmission housing;
 a sixth rotational member including the third ring gear and the fourth planet carrier, and directly connected to the output shaft;
 a seventh rotational member including the fourth sun gear and selectively connected to the input shaft; and
 six friction members including clutches interposed between a selected rotational member among the seven rotational members and the input shaft or between selected rotational members, and brakes interposed between a selected rotational member among the seven rotational members and the transmission housing.

10. The planetary gear train of claim 9, wherein the first planetary gear set is a single pinion planetary gear set, the second planetary gear set is a double pinion planetary gear set, the third planetary gear set is a single pinion planetary gear set, and the fourth planetary gear set is a single pinion planetary gear set.

11. The planetary gear train of claim 9, wherein the six friction members include:
 a first clutch interposed between the input shaft and the first rotational member;
 a second clutch interposed between the input shaft and the fourth rotational member;
 a third clutch interposed between the input shaft and the seventh rotational member;
 a fourth clutch interposed between the input shaft and the fifth rotational member;
 a fifth clutch interposed between the second rotational member and the fourth rotational member; and
 a first brake interposed between the fifth rotational member and the transmission housing.

12. The planetary gear train of claim 11, wherein the multiple shift-speeds include:
 a first forward speed achieved by operating the first clutch and the first brake;
 a second forward speed achieved by operating the third clutch and the first brake;
 a third forward speed achieved by operating the first clutch and the third clutch;
 a fourth forward speed achieved by operating the third clutch and the fifth clutch;
 a fifth forward speed achieved by operating the second clutch and the third clutch;

a sixth forward speed achieved by operating the third clutch and the fourth clutch;

a seventh forward speed achieved by operating the second clutch and the fourth clutch;

an eighth forward speed achieved by operating the fourth clutch and the fifth clutch;

a ninth forward speed achieved by operating the first clutch and the fourth clutch; and a reverse speed achieved by operating the second clutch and the first brake.

\* \* \* \* \*